US012772148B2

(12) United States Patent
Ianev et al.

(10) Patent No.: US 12,772,148 B2
(45) Date of Patent: Oct. 20, 2026

(54) EARLY DATA TRANSMISSION AUTHORIZATION CONTROL

(71) Applicant: NEC Corporation, Tokyo (JP)

(72) Inventors: Iskren Ianev, Reading (GB); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/526,513

(22) Filed: Dec. 1, 2023

(65) Prior Publication Data

US 2024/0098626 A1 Mar. 21, 2024

Related U.S. Application Data

(63) Continuation of application No. 17/721,821, filed on Apr. 15, 2022, now Pat. No. 11,871,334, which is a (Continued)

(30) Foreign Application Priority Data

Nov. 17, 2017 (EP) .................................... 17202452

(51) Int. Cl.

| | |
|---|---|
| ***H04W 28/02*** | (2009.01) |
| ***H04W 8/20*** | (2009.01) |
| ***H04W 8/24*** | (2009.01) |
| ***H04W 48/02*** | (2009.01) |
| ***H04W 48/12*** | (2009.01) |

(Continued)

(52) U.S. Cl.

CPC ............. *H04W 48/12* (2013.01); *H04W 8/20* (2013.01); *H04W 8/24* (2013.01); *H04W 48/02* (2013.01); *H04W 76/27* (2018.02); *H04W 74/0833* (2013.01); *H04W 84/042* (2013.01)

(58) Field of Classification Search

None

See application file for complete search history.

(56) References Cited

U.S. PATENT DOCUMENTS 11,638,188 B2 4/2023 Koskinen .............. H04W 48/16 370/331

2011/0194436 A1 8/2011 Song et al.

(Continued)

FOREIGN PATENT DOCUMENTS

CN 101507325 A 8/2009

CN 105072700 A 11/2015

(Continued)

OTHER PUBLICATIONS

TSG RAN WG2. "LS on Early Data Transmission", 3GPP TSG-RAN WG2 Meeting #99bis R2-1711978. Oct. 9-13, 2017, 2 pgs., Prague, Czechia.

(Continued)

*Primary Examiner* — Gary Lafontant

(74) *Attorney, Agent, or Firm* — Sughrue Mion, PLLC

(57) ABSTRACT

User equipment, UE, includes: a receiver configured to receive a parameter indicating whether the UE is restricted or authorized for transmission of user data in a message transmitted on Uplink Synchronization Channel, UL-SCH, from an access network node; and a hardware processor configured to process instructions to determine whether the transmission of the user data in the message is restricted or authorized based on the parameter.

6 Claims, 11 Drawing Sheets

Related U.S. Application Data continuation of application No. 16/763,419, filed as application No. PCT/JP2018/041498 on Nov. 8, 2018, now Pat. No. 11,330,507.

(51) Int. Cl.

| | |
|---|---|
| ***H04W 76/27*** | (2018.01) |
| *H04W 74/0833* | (2024.01) |
| *H04W 84/04* | (2009.01) |

(56) References Cited

U.S. PATENT DOCUMENTS

| | | | |
|---|---|---|---|
| 2016/0014815 A1 | 1/2016 | Vajapeyam et al. | |
| 2017/0048746 A1* | 2/2017 | Rönneke | H04W 28/0289 |
| 2018/0083972 A1 | 3/2018 | Kim | H04L 41/0853 |
| 2019/0014530 A1 | 1/2019 | Aghili | H04W 48/08 |
| 2019/0174554 A1 | 6/2019 | Deenoo et al. | |
| 2020/0037345 A1* | 1/2020 | Ryoo | H04W 74/0833 |
| 2020/0052963 A1 | 2/2020 | Kim | H04W 76/10 |
| 2021/0051724 A1 | 2/2021 | Yi | H04W 72/0446 |

FOREIGN PATENT DOCUMENTS

| | | |
|---|---|---|
| EP | 1758277 A2 | 2/2007 |
| JP | 2013-519302 A | 5/2013 |
| JP | 2019-523575 A | 8/2019 |
| WO | 2017/164658 A2 | 9/2017 |
| WO | 2017/197063 A1 | 11/2017 |
| WO | 2018/062967 A1 | 4/2018 |
| WO | 2018/174677 A1 | 9/2018 |
| WO | 2018/203727 A1 | 11/2018 |
| WO | 2018/204294 A1 | 11/2018 |
| WO | 20108/204294 A1 | 11/2018 |

OTHER PUBLICATIONS

TSG RAN WG2. "LS on Early Data Transmission", SA WG2 Meeting #S2-123. S2-177180 (R2-1711978). Oct. 23-27, 2017, 2 pgs., Ljubjana, Solvenia.

Sierra Wireless. "Early Data Transmission Analysis", 3GPP TSG RAN WG1 Meeting #90, R1-1714105, Aug. 21-25, 2017, 3 pgs., Prague, Czech Republic.

SA WG2. "Repply LS on Early Data Transmission", 3GPP TSG RAN WG2#100, R2-1712154 (S2-178180), Nov. 27-Dec. 1, 2017, 2 pgs, Reno, Nevada, USA.

Intel, "CN Overload Control for Control Plans Only PDN Connection", SA WG2 Meeting #117, S2-165567, Oct. 17-21, 2016, pp. 1-6, Kaohsiung, Taiwan.

3GPP RAN2, "LS on Early Data Transmission", 3GPP TSG SA WG3 (Security) Meeting #89, S3-173019 Nov. 27-Dec. 1, 2017, 2 pgs., Reno (US).

Mediatek Inc., "NPRACH resource partition for early data transmission", 3GPP TSG-RAN WG2 Meeting #99bis, R2-1711633. pp. 1-4, Oct. 9-13, 2017, Prague, Czech Republic.

NTT Docomo et al., "Localized and Distributed FDMA Application for Single-Carrier FDMA Radio Access in Evolved UTRA Uplink", TSG-RAN WG1 #42bis, R1-051144, pp. 1-5, Oct. 10-14, 2005, San Diego, USA.

Huawei et al., "Early DL data transmission", 3GPP TSG-RAN WG2 Meeting #102. R2-1807849 Resubmission of R2-1805081, May 21-25, 2018, pp. 1-5, Busan, Korea.

Huawei et al., "Early data transmission for eFeMTC", 3GPP TSG RAN WG1 Meeting #92bis, R1-1803884, Apr. 16-20, 2018, 7 pgs., Sanya, China.

International Search Report for PCT/JP2018/041498 dated Feb. 5, 2019 (PCT/ISA/210).

Written Opinion of the international Searching Authority for PCT/JP2018/041498 dated Feb. 5, 2019(PCT/ISA/237).

Japanese Office Action for JP Application No. 2020-528836 mailed on Jun. 22, 2021 with English Translation.

Huawei et al., "RACH procedure in early data transmission", 3GPP TSG RAN WG2 #100, R2-1713191, Nov. 17, 2017. Internet<URL http://www.3gpp.org/ffp/tsg_ran/WG2_RL2/TSGR2_100/Docs/R2-1713191.zip>.

Ericsson, "Remaining issues in Early Data Transmission over NAS", 3GPP TSG RAN WG2 #100, R2-1713056, Nov. 17, 2017, Internet<URL:http://www.3gpp.org/ftp/tsg_ran/WG2_RL2/TSGR2_100/Docs/R2-1713056.zip>.

ZTE, "Further consideration on early data transmission in eFeMTC and FeNB-IoT", 3GPP TSG RAN WG2 #99bis, R2-1710987, Sep. 29, 2017, Internet<URL:http://www.3gpp.org/ftp/tsg_ran/WG2_RL2/TSGR2_99bis/Docs/R2-1710987.zip>.

Nokia et al., "Data transmission during random access procedure", 3GPP TSG RAN WG1 #91, R1-1720135, Nov. 17, 2017, internet<URL:https://www.3gpp.org/ftp/tsg_ran/WG1_RL1/TSGR1_91/Docs/R1-1720135.zip>.

European Office Action for EP Application No. 18811375.7 mailed on Dec. 9, 2021.

Ericsson: "TBS limitation and indication of category for low complxity UEs", 3GPP DRAFT, TSG-RAN WG2 #87. R2-143332, Dresden, Germany, Aug. 8, 2014, XP050819604.

Ericsson: "Report from Rel-15 MTC session", 3GPP DRAFT, TSG-RAN WG2 Meeting #bis, R2-1711838, Prague, Czech Republic, Oct. 13, 2017, XP051355920.

Japanese Office Action for JP Application No. 2021-129650, mailed on Nov. 15, 2022 with English Translation.

Intel Corporation, "Early data transmission discussion for efeMTC and FeNB-IoT" [online], 3GPP TSG RAN WG2 Meeting #99bis R2-1710642, [Retrieved on Nov. 2, 2022] on internet <URL:https://www.3gpp.org/ftp/TSG_RAN/WG2_RL2/TSGR2_99bis/Docs/R2-1710642.zip>, Sep. 29, 2017.

CN Office Action for CN Application No. 201880074293.4, mailed on Feb. 23, 2023 with English Translation.

JP Office Action for JP Application No. 2023-100470, mailed on May 21, 2024 with English Translation.

NEC, "Key Issue #1 Solution: Single downlink packet delivery via EDT" [online], 3GPP SA WG2 Meeting #128 bis S2-187899, [Search on May 14, 2024], Internet <URL:https://www.3gpp.org/ftp/tsg_sa/WG2_Arch/TSGS2_128BIS_Sophia_Antipolis/Docs/S2-187899.zip>, Aug. 14, 2018.

CN Office Communication for CN Application No. 201880074293.4, mailed on Oct. 10, 2024 with English Translation.

Qualcomm Incorporated, "UL Early data transmission", 3GPP TSG-RAN WG2 Meeting #99, R2-1708233, Aug. 12, 2017, pp. 1-pp. 13.

Huawei, HiSilicon, Neul, "Early data transmission for the CP solution", 3GPP TSG-RAN WG2 Meeting #99, R2-1708300, Aug. 11, 2017, pp. 1-pp. 9.

* cited by examiner

EARLY DATA TRANSMISSION AUTHORIZATION CONTROL

CROSS-REFERENCE TO RELATED APPLICATIONS

The present application is a continuation application of U.S. patent application Ser. No. 17/721,821 filed on Apr. 15, 2022, which issued as U.S. Pat. No. 11,871,334, which is a continuation application of U.S. patent application Ser. No. 16/763,419 filed on May 12, 2020, which issued as U.S. Pat. No. 11,330,507, which is a National Stage Entry of international application PCT/JP2018/041498 filed on Nov. 8, 2018, which claims the benefit of priority from European Patent application Ser. No. 17/202,452.3 filed on Nov. 17, 2017, the disclosures of all of which are incorporated in their entirety by reference herein.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular but not exclusive relevance to authorization control for Early Data Transmission (EDT) in the so-called 'Next Generation' systems.

BACKGROUND ART

3GPP Working Groups are discussing the introduction of the EDT feature for the Rel-15 enhanced Machine Type Communication (eMTC) and Narrow Band Internet of things (NB-IoT). This feature allows the User Equipment (UE) to send small data (using Control and User Plane Cellular IoT (CIoT) Evolved Packet System (EPS) Optimization) in a Radio Resource Control (RRC) message 3 (Msg3: the message transmitted on Uplink Synchronization Channel (UL-SCH) containing a Cell Radio Network Temporary Identifier (C-RNTI), Media Access Control Control Element (MAC CE) or Common Control Channel Service Data Unit (CCCH SDU), submitted from upper layer and associated with the UE Contention Resolution Identity, as part of a random access procedure). Note that MsgX in the following refers generally to step X in the contention-based random-access procedure, see FIG. 1 (TS 36.300, FIG. 10.1.5.1-1). For example, the message denoted by 'Msg3' is the first scheduled Uplink (UL) message on the grant provided by a Random Access Response (RAR) message. A normal Downlink (DL)/UL transmission can take place after the random access procedure.

The 3GPP RAN2 Working Group agreements so far were communicated with the LS R2-1711978/S2-177180.

TABLE 1

| RAN2#99 Agreements: |
|---|
| We intend to support early UL data transmission in Msg3 for control plane and user plane CIoT EPS optimisation.<br>We intend to support early DL data transmission in Msg4 for control plane and user plane CIoT EPS optimisation.<br>Early data transmission feature is considered when AS security was not established for only transmitting data using CP.<br>Early data transmission feature is considered when AS security was established for transmitting data using CP and/or UP. |

3GPP RAN2 further discussed the details on the EDT feature and made the following agreements in RAN2 #99bis.

TABLE 2

| RAN2#99bis Agreements: |
|---|
| The intention to use EDT is for data, i.e. not for NAS signalling.<br>RAN2 assumes that S-TMSI for CP, and resumeID and shortResumeMAC-I for UP solutions are sufficient to identify UE at the MME and eNB respectively.<br>For CP solution, NAS PDU for data is encapsulated in the RRC message sent in Msg3 and transmitted as CCCH SDU.<br>For CP solution, NAS PDU data in the DL can be optionally encapsulated in the RRC message sent in Msg4 and transmitted as CCCH SDU.<br>For UP solution, SRB0 is used to transmit the RRC message in Msg3.<br>For UP solution, AS security is resumed before transmitting Msg3, and data transmitted in Msg3 is protected by AS security.<br>For UP solution, DL data can be optionally multiplexed in MAC, i.e. DCCH (RRC message(s)) and DTCH (UP data) in Msg4.<br>Msg4 decides whether the UE goes to RRC connected mode or RRC idle mode. The content of Msg4 for EDT is FFS.<br>It is FFS if there is a need to introduce an authorization mechanism.<br>FFS: For UP solution: case for pinned connection, i.e. CCCH (RRCConnectionResumeReq) + DCCH (NAS PDU via pinned connection) |

As indicated above, RAN2 intends to support the early UL data transmission in Msg3 for control plane and user plane CIoT Evolved Packet System (EPS) Optimization.

According to the current procedure, the transmission of Msg3 is performed on the initial UL grant provided by the RAR, so that the size of the transport block depends on the grant. When an uplink transmission is required, e.g., for the contention resolution, the evolved NodeB (eNB) should not provide a grant smaller than 56 bits (or 88 bits for NB-IoT) in the RAR (see TS 36.300).

Msg3 and Msg4 (Contention Resolution) (see FIG. 1) use the Hybrid Automatic Repeat Request (HARQ) process. According to the current specification, Msg3 conveys at least a Non-Access Stratum (NAS) UE identifier for initial access, but no NAS message. Msg3 transmission is done using a separate Msg3 buffer (which has higher priority than the UL buffer).

Control Plane (CP) CIoT EPS Optimization Early Data Transmission

An example call flow allowing the data transmission in Msg3 (UL) and/or Msg4 (DL) as a NAS Protocol Data Unit (PDU) is shown in the FIG. 2. The steps are briefly described below.

A. Resource determination: The eNB 5 decides to allow an early transmission of small data packet sizes without establishing a full RRC connection. The eNB 5 allocates Physical Random Access Channel (PRACH) resources for this purpose.

0. The eNB 5 announces the resources via the system information broadcast (SIB).

B. The UE 3 selects a PRACH resource based on the announced resources and the amount of data to transmit. The selection may be based on the random selection from the corresponding PRACH pool.

Note: If no PRACH resource is broadcast in Msg0 for data in the Msg3 procedure, or the UE 3 intends to perform a NAS signaling procedure or the UE 3 intends to send/receive more data than possible in one Medium Access Control (MAC) block, the UE 3 uses a legacy RRC connection establishment/resumption procedure.

1. The UE 3 transmits an appropriately formatted PRACH preamble (Msg1: Random Access Preamble).

2. The UE 3 receives a RAR (Msg2). In the current Long Term Evolution (LTE), the RAR may contain an uplink grant and a Timing Advance (TA) (in addition to a Temporary C-RNTI etc.). To enable the data transmission in Msg3, the RAR may be updated to include power control information. Otherwise, the UE 3 may use the open-loop power control (i.e., the UE 3 decides on the transmit power itself).
3. The UE 3 transmits an appropriately formatted Msg3 with a UE Identifier (UEID) (discussed later) and a NAS PDU using the UL grant indicated in the RAR. The UE 3 considers the power control information from the RAR, if included. The UE 3 starts a contention resolution timer after this step.
4-6. The eNB 5 selects an appropriate Mobility Management Entity (MME) 9 based on the UEID and forwards the NAS PDU to the selected MME 9. The eNB 5 may indicate to the MME 9 that the UE 3 has initiated an EDT procedure. If DL data is available for the UE 3, the Serving Gateway (SGW) 11 provides the downlink data to the MME 9, the MME 9 forwards the downlink data as a NAS PDU to the eNB 5, and the NAS PDU is delivered to the UE 3. If the eNB 5 has indicated that the UE 3 initiated an early data transmission, in response, the MME 9 may also be configured to close the associated S1-AP connection after forwarding any downlink NAS PDU. This indication may also be used by the MME 9 to prioritize the processing of the UL data and expedite step 6.
7. The Network responds with an appropriately formatted Msg4 which confirms reception of the Msg3, completes the contention resolution, and includes a NAS PDU (if necessary). If the NAS PDU is included, the NAS will be able to confirm if it is communicating with a valid network.
Note: The current NAS specification does not mandate the MME to respond with anything to confirm a reception of the NAS PDU, hence the NAS PDU is optional.

SUMMARY OF INVENTION

Technical Problem

The usage of the Early Data Transmission (EDT) over Msg3 (i.e. the current RRC Connection Request message, see FIG. 1 and FIG. 2) would require a specific Radio Access Network (RAN) functionality like the Physical Random Access Channel (PRACH) resource allocation for the EDT which would be broadcast in the System Information (SI). The UE 3 that is EDT-capable and wants to transmit small data via the EDT would use the specially allocated PRACH resources (e.g. PRACH preambles) in the Random Access Preamble message in order to access the network. The UE 3 selects a PRACH resource/preamble based on the announced resources in the SIB and on the amount of data that the UE 3 wants to transmit. The selection of the PRACH resource/preamble may be based on random selection from the corresponding PRACH pool. If there are many UEs wanting to use the EDT, the allocated PRACH resources/preambles may not be sufficient, although the PRACH resource allocation for the EDT is broadcast. This would lead for some UEs to be unable to use the EDT feature for the data transfer and these UEs would use the data transfer via control plane or user plane CIoT Optimization, instead.

The inventors have realized that it would be advantageous to restrict (when and where necessary) the usage of the EDT feature in order to ensure that only specific subscribers (e.g. those authorized by subscription) are able to benefit from the EDT feature.

Also, as mobile network operators may expose the EDT to the Service Providers as a service capability, it would be desirable for a 3rd party Service Provider to be able to query the status of the EDT, or enable/disable the EDT feature per UE.

Accordingly, an object of the present disclosure is to provide a UE, a core network node, an access network node, a transmission control method, and a control method which solve the problem of difficulty in appropriately controlling the EDT.

Solution to Problem

In order to achieve the object, user equipment, UE, as an aspect of the present disclosure includes a receiver and a hardware processor. The receiver is configured to receive a parameter indicating whether the UE is restricted or authorized for transmission of user data in a message transmitted on Uplink Synchronization Channel, UL-SCH, from an access network node. The hardware processor is configured to process instructions to determine whether the transmission of the user data in the message is restricted or authorized based on the parameter.

Further, a core network node as another aspect of the present disclosure includes a memory and at least one processor. The memory is for storing instructions. The processor is configured to process instructions to determine whether UE is restricted or authorized for transmission of user data in a message transmitted on UL-SCH.

Further, an access network node as another aspect of the present disclosure includes a transmitter. The transmitter is configured to transmit a parameter indicating whether UE is restricted or authorized for transmission of user data in a message transmitted on UL-SCH to the UE and information of a granted packet size for the transmission of the user data in the message.

Further, a method for UE as another aspect of the present disclosure includes: receiving a parameter indicating whether the UE is restricted or authorized for transmission of user data in a message transmitted on UL-SCH from an access network node; and processing instructions to determine whether the transmission of the user data in the message is restricted or authorized based on the parameter.

Further, a method for a core network node as another aspect of the present disclosure includes: storing instructions; and processing instructions to determine whether UE is restricted or authorized for transmission of user data in a message transmitted on UL-SCH.

Further, a method for an access network node as another aspect of the present disclosure includes transmitting a parameter indicating whether UE is restricted or authorized for transmission of user data in a message transmitted on UL-SCH to the UE and information of a granted packet size for the transmission of the user data in the message.

Further, a system as another aspect of the present disclosure includes UE and an access network node. The UE includes the configuration of the above-described aspect of the present disclosure. The access network node includes the configuration of the above-described aspect of the present disclosure.

Advantageous Effects of Invention

With the configurations as described above, the present disclosure enables provision of a UE, a core network node, an access network node, a transmission control method, and a control method which solve the problem of difficulty in appropriately controlling the EDT.

DESCRIPTION OF ASPECTS

First Example Aspect

Figure 8:
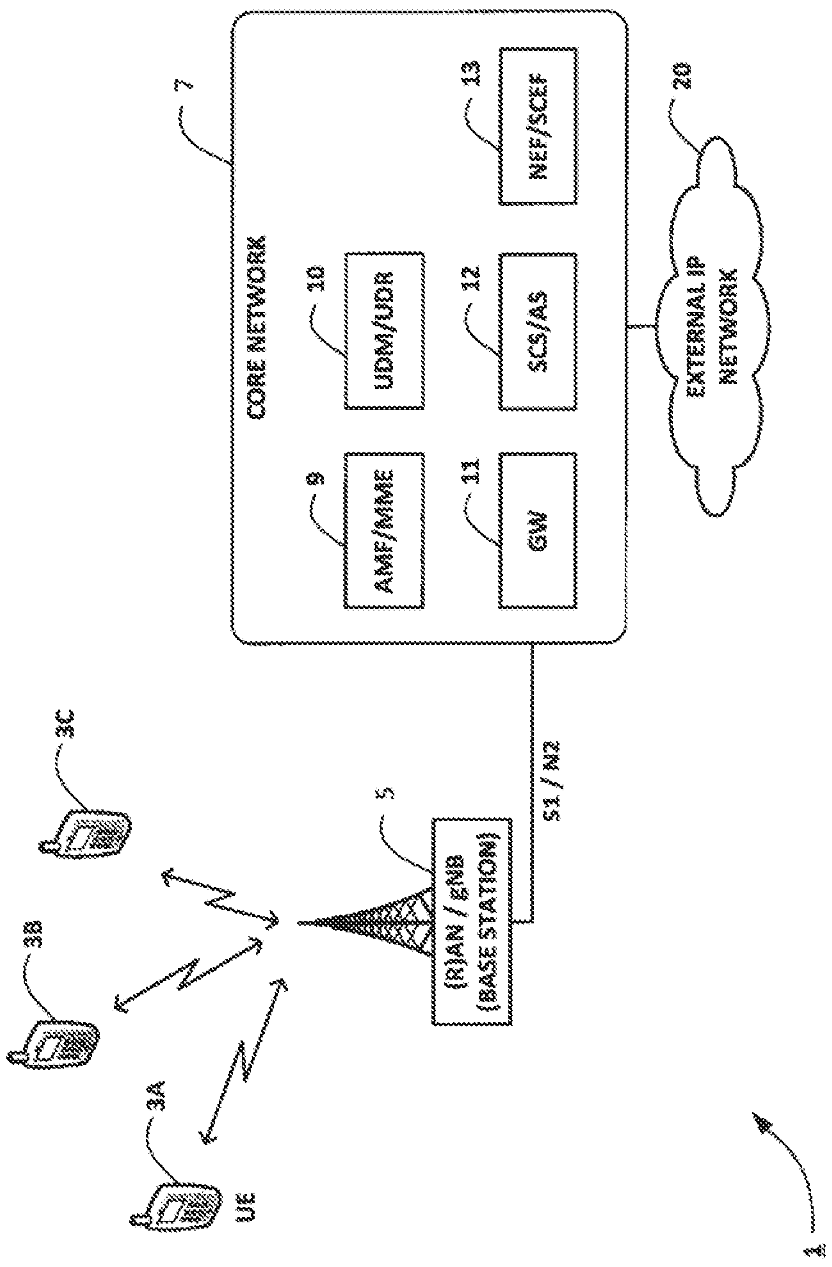
FIG. 8 schematically illustrates a mobile (cellular or wireless) telecommunication system 1.
Figure 9:
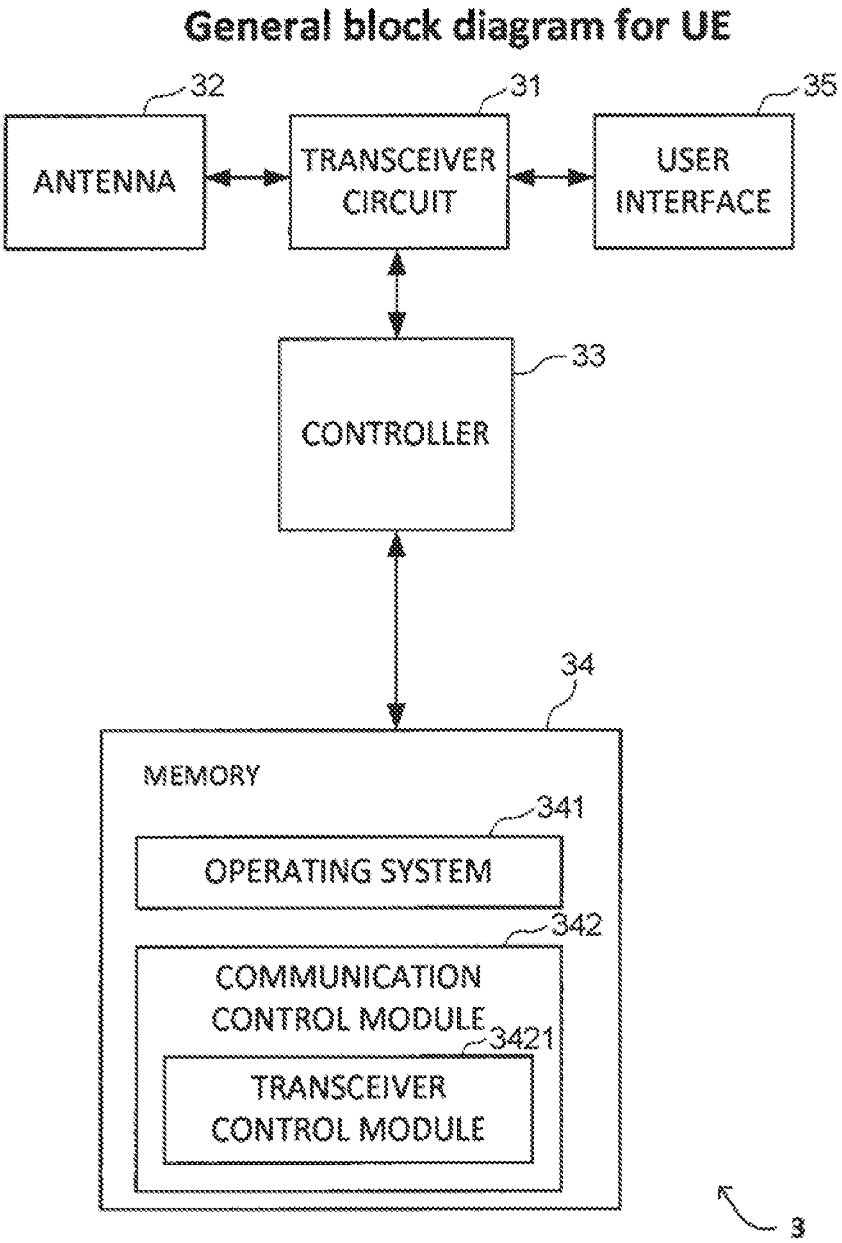
FIG. 9 is a block diagram illustrating the main components of the UE.
Figure 10:
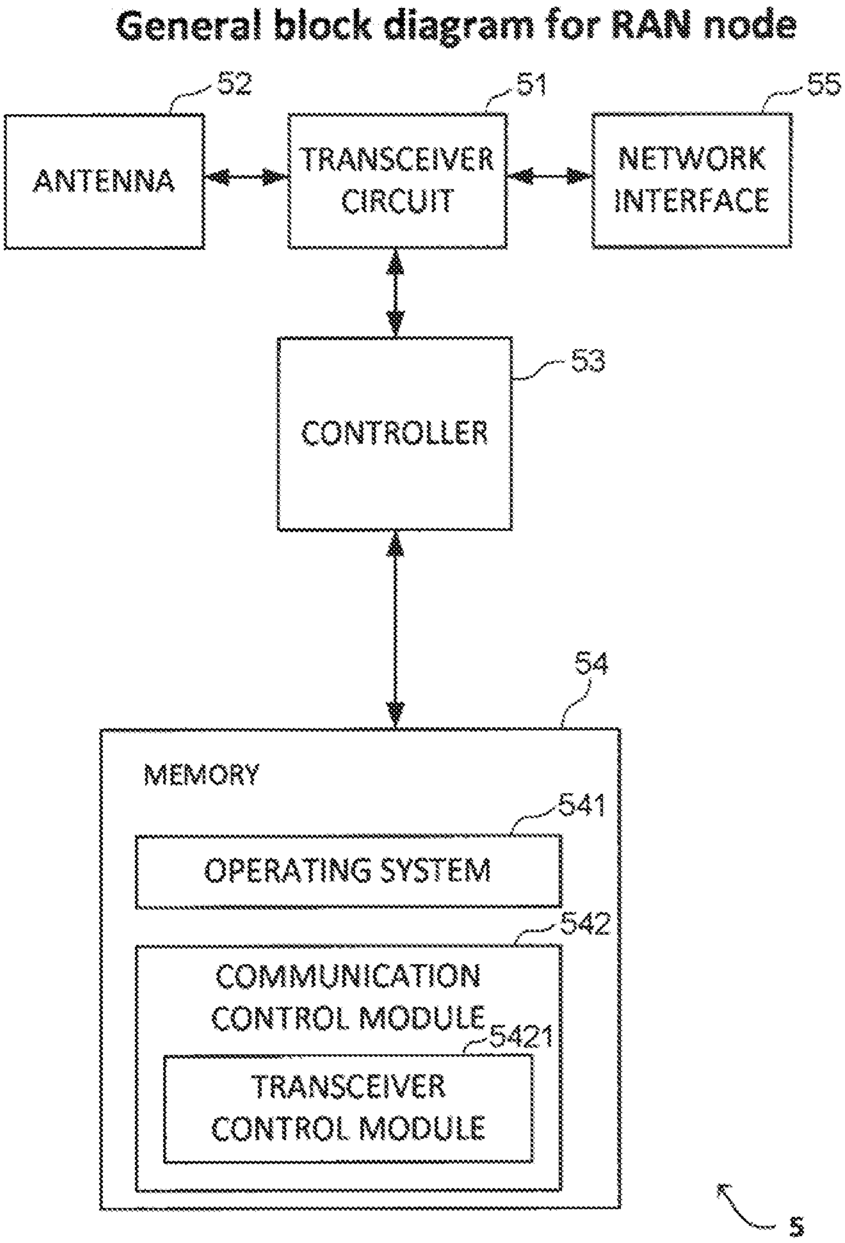
FIG. 10 is a block diagram illustrating the main components of the RAN node 5.
Figure 11:
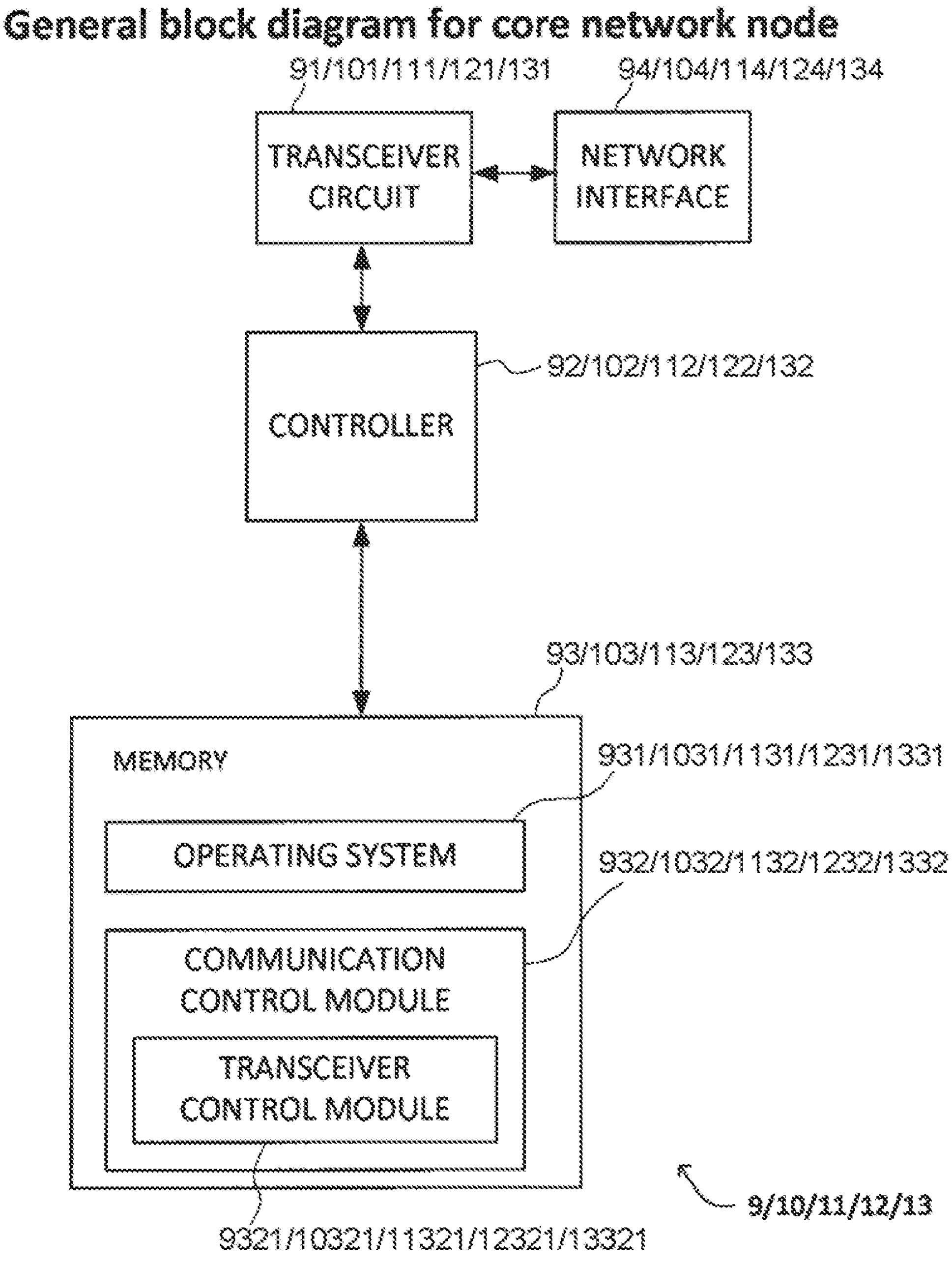
FIG. 11 is a block diagram illustrating the main components of an example core network node.

FIGS. 3 to 7 illustrate schematically some of example ways in which the above issues may be addressed. FIG. 8 illustrates schematically a cellular telecommunication system to which the techniques presented in this document may be applied. FIGS. 9 to 11 are schematic block diagrams of some of the nodes shown in FIGS. 1 to 8.

Solution 1: EDT Restriction/Authorization Control by the Network

Solution 1 proposes an EDT restriction/authorization control by the network. The EDT restriction/authorization control would enable the network (i.e. a network operator) to restrict or authorize the use of the EDT for each UE 3 or each group of UEs. In order to restrict or authorize the EDT for specific UEs, it is proposed to introduce a new subscription parameter in the Unified Data Management (UDM)/Unified Data Repository (UDR), Home Subscriber Server (HSS) or Home Location Register (HLR) 10 called an EDT restriction parameter (or EDT authorization parameter or EDT barred parameter or any other name for the parameter for the purpose of authorization or restriction of the EDT use by the UEs). This parameter is kept in the UDM/UDR, HSS or HLR 10 and specifies per Public Land Mobile Network (PLMN) whether the EDT functionality is restricted or authorized (i.e. allowed or not allowed) for the UE 3. The EDT restriction/authorization parameter can be configured in the UDM/UDR, HSS or HLR 10 via Operation and Maintenance (O&M) module. Also, a 3rd party Service Provider can query or enable/disable the EDT restriction/authorization parameter in the UDM/UDR, HSS or HLR 10 via the Network Exposure Function (NEF) or the Service Capability Exposure (SCEF) 13.

Figure 1:
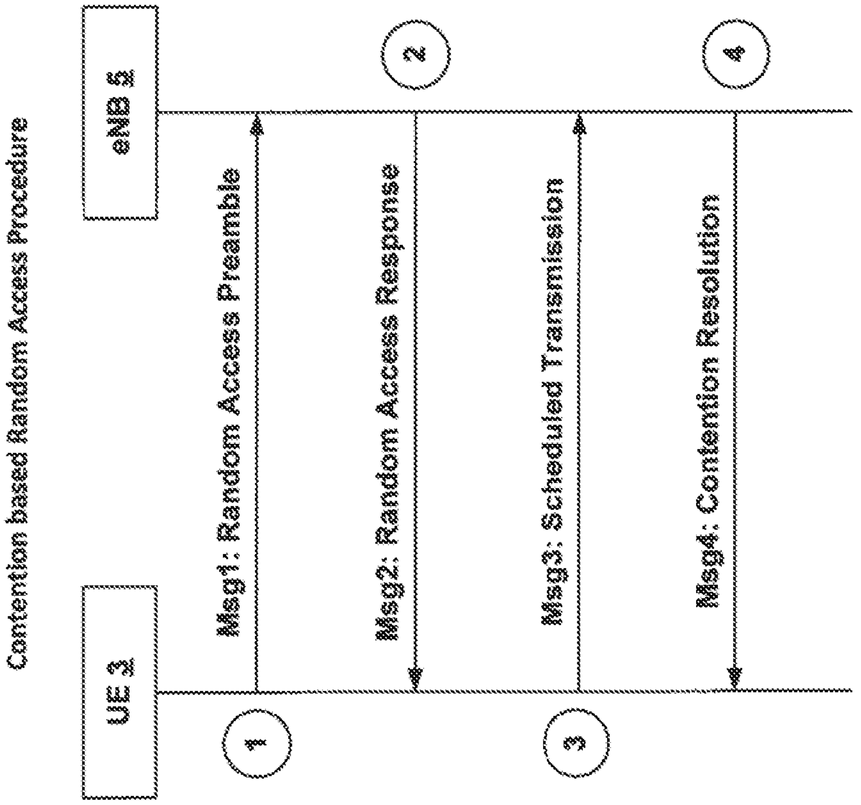
FIG. 1 is a diagram illustrating an example of contention-based random access.
Figure 2:
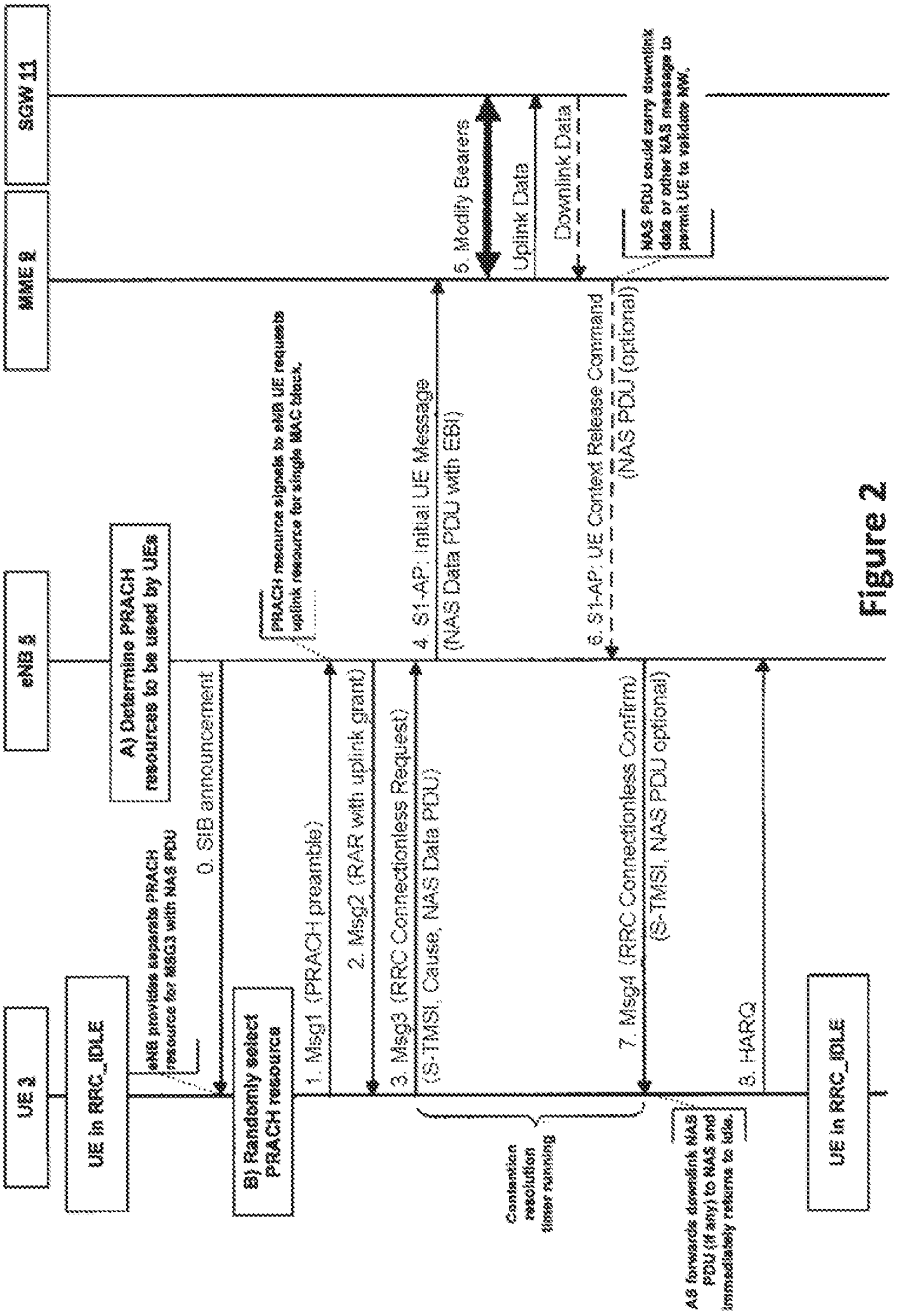
FIG. 2 is a diagram illustrating an example of a call flow allowing the data transmission.
Figure 3:
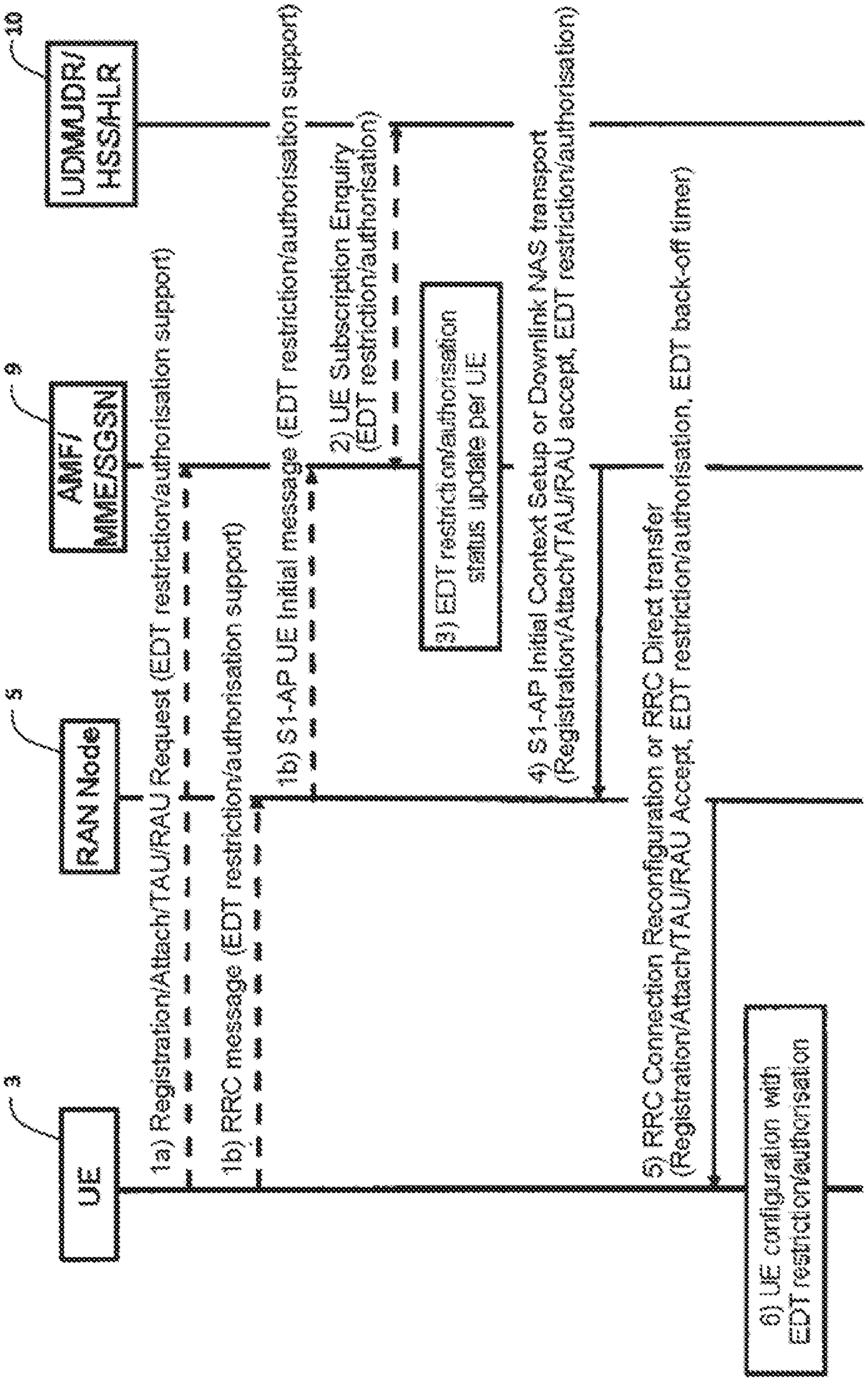
FIG. 3 demonstrates an EDT restriction/authorization control by the network during Registration procedure, Attach procedure, or TAU/RAU procedure.

FIG. 3 demonstrates an EDT restriction/authorization control by the network during Registration, Attach or TAU/RAU procedures.

1a) If the UE 3 is EDT-capable and the UE 3 supports the EDT restriction/authorization functionality (e.g. by subscription for the EDT restriction/authorization support), the UE 3 indicates its capability to support the EDT restriction/authorization (e.g. for the RAT (Radio Access Technology) the UE 3 is camping on) to the AMF/MME/SGSN 9 in an appropriately formatted Registration Request, Attach Request, or TAU/RAU Request message (and/or any other suitable NAS message).

In another aspect, the UE 3 may indicate its EDT capability feature support (e.g. indication that the UE 3 is EDT-capable) in an appropriately formatted Registration Request, Attach Request, or TAU/RAU Request message (and/or any other suitable NAS message). In this case, the EDT feature support indication can be interpreted by the AMF, the MME or the SGSN 9 as if the UE 3 is EDT-capable and the UE 3 supports the EDT restriction/authorization handling as well.

1b) The UE 3 may optionally indicate its support for the EDT restriction/authorization to the AMF/MME/SGSN 9 indirectly via the RAN Node 5 (e.g. a base station, gNB, eNB or RNC)—first in an RRC message (e.g. an appropriately formatted RRC Connection Request or RRC Connection Setup Complete or any other suitable AS message) to the RAN Node 5 (gNB, eNB or RNC) and then the RAN Node 5 forwards the EDT restriction/authorization support parameter to the AMF/MME/SGSN 9 within an appropriate N2-AP/S1-AP UE Initial message or within any other suitable (existing or new) message on the N2/S1 interface between the RAN Node 5 and AMF/MME/SGSN 9.

In another aspect, the UE 3 may indicate its EDT capability feature support (e.g. indication that the UE 3 is EDT-capable) in the RRC Connection Request or RRC Connection Setup Complete or any other AS message and consequently in the N2-AP/S1-AP UE Initial message. In this case, the EDT feature support indication can be interpreted by the AMF, the MME or the SGSN 9 as if the UE 3 is EDT-capable and the UE 3 supports the EDT restriction/authorization handling as well.

2) If the AMF/MME/SGSN 9 has no subscription information for the UE 3, the AMF/MME/SGSN 9 may perform a UE subscription inquiry with the UDM/UDR, HSS or HLR 10 for the UE 3 (for example, via the Update Location Request/Ack procedure or any other procedure for the UE subscription information retrieval/inquiry from the UDM/UDR, HSS or HLR 10). This includes the EDT restriction/authorization subscription parameter for that UE 3. This parameter is kept as part of subscription data in the UDM/UDR, HSS or HLR 10 and specifies whether the EDT functionality is restricted or not for the UE 3. The EDT restriction/authorization can be per RAT within that PLMN, per PLMN, or for all PLMNs including user's HPLMN.

3) The AMF/MME/SGSN 9 updates the UE context with the latest status of the EDT restriction/authorization parameter received from the UDM/UDR, HSS or HLR 10.

4) If the UE 3 is EDT-capable and the UE indicated a support for the EDT restriction/authorization in step 1 via the NAS or AS message, the AMF/MME/SGSN 9 indicates to the RAN node 5 (gNB, eNB or RNC) within the N2/AP/S1-AP Initial Context Setup Request message (or any other message on the AMF/gNB interface, the MME/eNB interface or the SGSN/RNC interface) whether the UE 3 is restricted or authorized (based on the EDT restriction/authorization parameter value from the UDM/UDR, HSS or HLR 10) to use the EDT feature in the RAN whenever the UE context is established, e.g. during a Service Request procedure, Registration Procedure, Attach procedure, and TAU/RAU procedure.

The AMF/MME/SGSN 9 also includes the Registration/Attach/TAU/RAU accept message in the N2-AP/S1-AP Initial Context Setup Request message or in a Downlink NAS transport message to the RAN node 5. If the UE 3 included support for the EDT restriction/authorization in step 1, the AMF/MME/SGSN 9 includes the EDT restriction/authorization parameter in the Registration Accept message/Attach Accept message/TAU accept message/RAU accept message or any other NAS message to the UE 3.

The EDT restriction/authorization parameter may take values such as "EDT restricted/not restricted," "EDT barred/not barred," "EDT authorized/not authorized," "Use CIoT C-plane mechanism instead of EDT," "Use CIoT U-Plane mechanism instead of EDT," or "EDT Temporally not available." If the EDT is temporally not available due to any reason in the EPC or SGC, for example, the AMF/MME/SGSN 9 is congested or the NEF/SCEF 13 is congested, the AMF/MME/SGSN 9 may include an EDT back-off timer to indicate how long the use of the EDT is restricted. In a case that the AMF/MME/SGSN 9 indicates "EDT Temporally not available" to the UE 3 but no EDT back-off timer, the UE 3 can use the back-off timer value for the "CIoT C-plane back-off timer" if this information is available in the Registration Accept message/Attach Accept message/TAU accept message/RAU accept message or any other NAS message.

5) The RAN Node 5 forwards the received NAS message (e.g. Registration/Attach/TAU/RAU accept or any other NAS message) to the UE 3 within an RRC Connection Reconfiguration message or an RRC Direct transfer message or any other suitable RRC message.

6) The UE 3 is configured to use the value of the received EDT restriction/authorization parameter to determine if the EDT feature is restricted or authorized (e.g. allowed or not, barred or not barred).

If the UE 3 is EDT-capable, the UE 3 assumes the EDT feature is allowed unless explicitly restricted/barred by the network.

If the EDT feature is restricted/barred by the network, the UE 3 does not attempt for the EDT until the EDT restriction is lifted by the network explicitly (e.g. in the signaling to the UE 3) or the UE 3 moves to another RAT or PLMN.

If the EDT feature is restricted and an EDT back-off timer is included, the UE 3 does not attempt for the EDT until the expiry of the EDT back-off timer.

Figure 4:
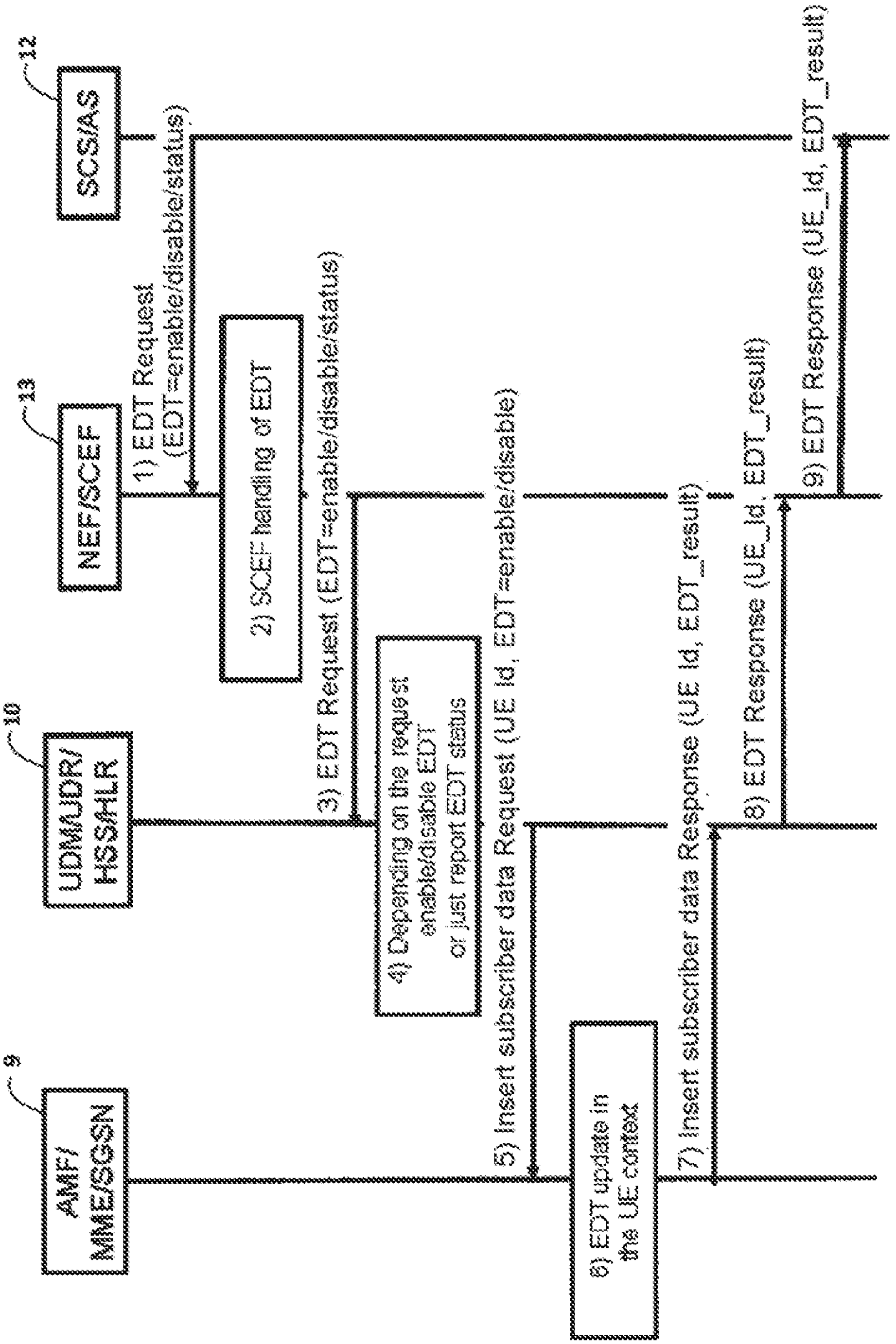
FIG. 4 demonstrates an EDT restriction/authorization control by the Service Operator via the NEF/SCEF.

FIG. 4 demonstrates an EDT restriction/authorization control by the Service Operator via the NEF/SCEF 13.

1. The SCS/AS 12 (Service Capability Server/Application Server) sends an EDT Request (including at least one of an External Identifier or MSISDN, SC S/AS Identifier, and EDT) message to the NEF/SCEF 13. The EDT parameter (or any other name for a parameter with the same purpose) indicates if the request is to query the status of the EDT feature (e.g. whether restricted or not) or to enable/disable the EDT restriction/authorization subscription parameter in the UDM/UDR, HSS or HLR 10 for a specific UE or group of UEs.

2. The NEF/SCEF 13 stores the SCS/AS Identifier. The NEF/SCEF 13 assigns a NEF/SCEF Reference ID. Based on operator policies, if either the SCS/AS 12 is not authorized to perform this request (e.g. if the SLA does not allow for it) or the SCS/AS 12 has exceeded its quota or rate of submitting EDT requests, the NEF/SCEF 13 returns an EDT Response (as shown in step 9) and provides a value in the EDT result parameter appropriately indicating a failure result.

3. The NEF/SCEF 13 sends an EDT Request (EDT) message to the UDM/UDR, HSS or HLR 10.

4. The UDM/UDR, HSS or HLR 10 examines the EDT Request message, e.g. whether the EDT restriction/authorization feature is supported by the serving AMF/MME/SGSN 9. If this check fails, the UDM/UDR, HSS or HLR 10 returns an EDT Response message at step 8 and provides a value in the EDT result parameter indicating a failure to the NEF/SCEF 13.

If the EDT Request is to get the current status of the EDT restriction/authorization parameter in the UDM/UDR, HSS or HLR 10, the UDM/UDR, HSS or HLR 10 examines the value of the EDT restriction/authorization parameter and returns an EDT Response message at step 8. In the EDT Result parameter, the UDM/UDR, HSS or HLR 10 includes information about the EDT restriction—whether use of the EDT feature is restricted or not (e.g. enabled or disabled).

If the EDT parameter in the EDT Request message is to enable or to disable the EDT feature, the UDM/UDR, HSS or HLR 10 sets the EDT restriction/authorization parameter in the UDM/UDR, HSS or HLR 10 to the appropriate value (e.g. EDT allowed or not allowed).

5. The UDM/UDR, HSS or HLR 10 sends an Insert Subscriber Data Request to the AMF/MME/SGSN 9 in order to update the EDT restriction/authorization parameter (enable or disable the use of EDT feature) within the AMF/MME/SGSN context.

6. Based on operator policies, the AMF/MME/SGSN 9 may reject the request (e.g. overload or the UDM/UDR, HSS or HLR 10 has exceeded its quota or its rate for submitting EDT restriction/authorization requests).

The AMF/MME/SGSN 9 updates the EDT restriction/authorization parameters in the AMF/MME/SGSN context. For example, the AMF/MME/SGSN 9 may be configured to transfer the EDT restriction/authorization parameter as part of its context information during an AMF/MME/SGSN change.

The AMF/MME/SGSN 9 updates the EDT restriction/authorization parameter in the UE at the next TAU/RAU, or based on the local operator policy, the network can detach the UE indicating re-attach is required.

7. If the EDT restriction/authorization is updated successfully, the AMF/MME/SGSN 9 sends back an Insert Subscriber Data Response message to the UDM/UDR, HSS or HLR 10. The AMF/MME/SGSN 9 may include the EDT result parameter in the Insert Subscriber Data Response message in order to indicate success or failure in updating the EDT restriction/authorization parameter in the AMF/MME/SGSN context.

8. The UDM/UDR, HSS or HLR 10 sends an EDT Response (NEF/SCEF Reference ID, EDT result) message to the NEF/SCEF 13. The UDM/UDR, HSS or HLR 10 includes EDT result indicating success/failure.

9. The NEF/SCEF 13 sends an EDT Response (EDT result) message to the SC S/AS 12. The EDT result indicates success or failure. If in the step 1 the EDT Request message was sent to query the status of EDT restriction/authorization parameter in the UDM/UDR, HSS or HLR 10, the EDT result parameter indicates the status of the EDT restriction/authorization parameter in the UDM/UDR, HSS or HLR 10—EDT allowed or EDT disallowed.

Figure 5:
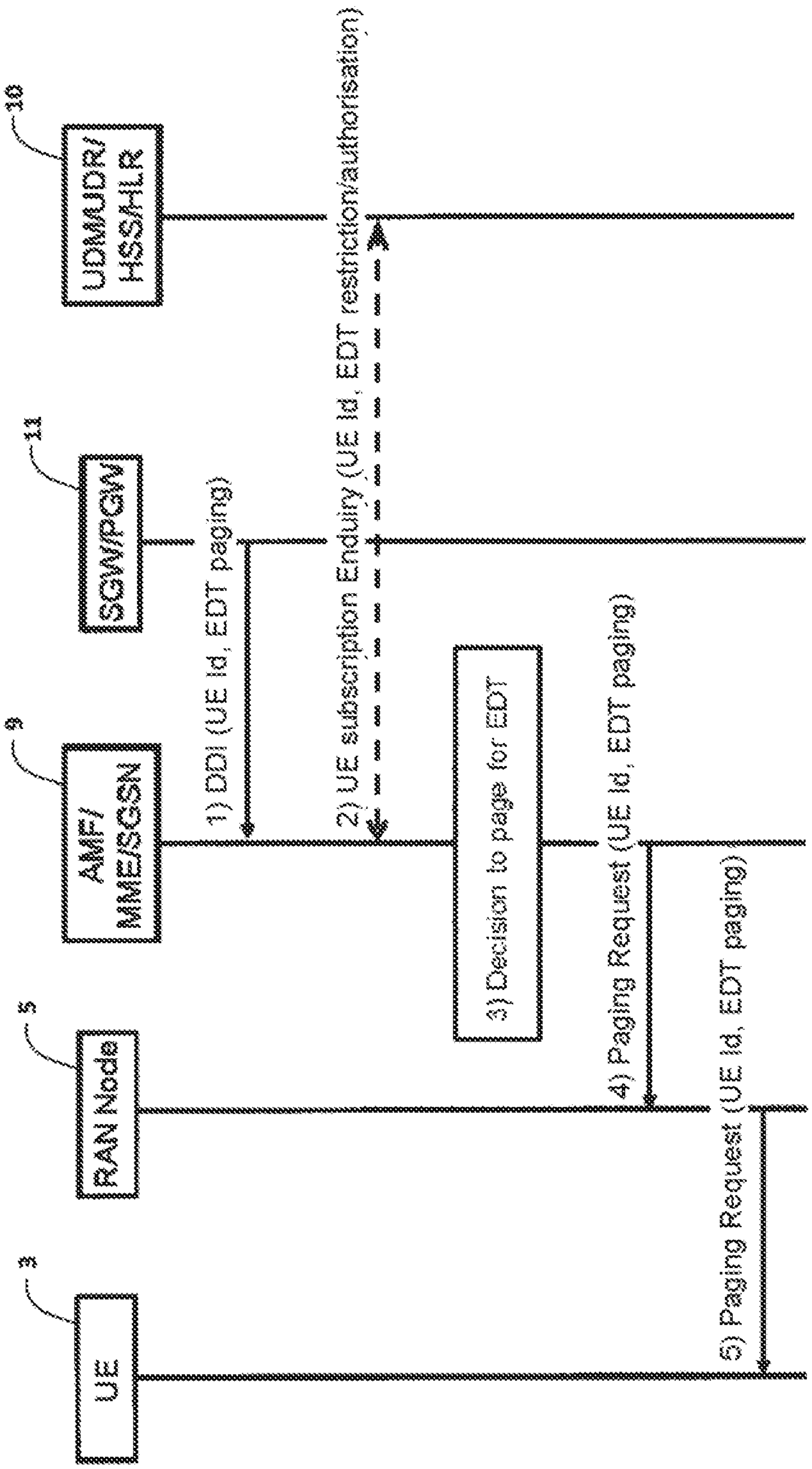
FIG. 5 demonstrates a Paging for EDT with controlled EDT use.

FIG. 5 demonstrates a Paging for EDT with controlled EDT use.

1. The AMF/MME/SGSN 9 receives a Downlink Data Indication (DDI) with request for the Early Data Transmission (EDT) in downlink (an EDT paging or any other name for indication or parameter with the meaning that the paging is for the downlink EDT). The AMF/MME/SGSN 9 stores the received indication for the EDT paging. If the EDT restriction/authorization parameter in the AMF/MME/SGSN context is not set to restriction (e.g. the EDT restriction/authorization parameter is not set to restriction), the AMF/MME/SGSN 9 includes the EDT paging parameter in every subsequent Paging message to all gNBs/eNBs/RNCs 5 selected by the AMF/MME/SGSN 9 for paging.
2. If the AMF/MME/SGSN 9 does not have the information (the EDT restriction/authorization parameter) whether the paged UE 3 is authorized (i.e. not restricted) for use of the EDT, the AMF/MME/SGSN 9 makes a subscription inquiry with the UDM/UDR, HSS or HLR 10 to retrieve the UE's subscription information (for example, via the Update Location Request/Ack procedure or any other procedure for the UE subscription information retrieval/inquiry from the UDM/UDR, HSS or HLR 10).
3. If the paged UE 3 is authorized for the EDT (e.g. the EDT use for this UE 3 is not restricted, for example, via a subscription parameter like EDT Restriction/authorization), the AMF/MME/SGSN 9 decides to page the UE 3 for the EDT.
4. The AMF/MME/SGSN 9 sends a Paging Request to the connected RAN Nodes 5 in which along with the UE ID, the AMF/MME/SGSN 9 includes an EDT paging parameter (or any other name for a parameter) which indicates that the paging is for the EDT.
5. The RAN Node 5 forwards the Paging Request on the System Information Broadcast message where the Paging message is broadcast with the EDT paging parameter in it.

A mobile terminal that is EDT-capable and is paged for the EDT (i.e. with the EDT paging parameter in the Paging message) is configured to answer the paging and following the procedure for the EDT data transmission (e.g. use the PRACH preamble designated for the EDT) and transfer the data (e.g. data PDU or NAS data) within Msg2 (RRC Connection/Connectionless Request message).

Figure 6:
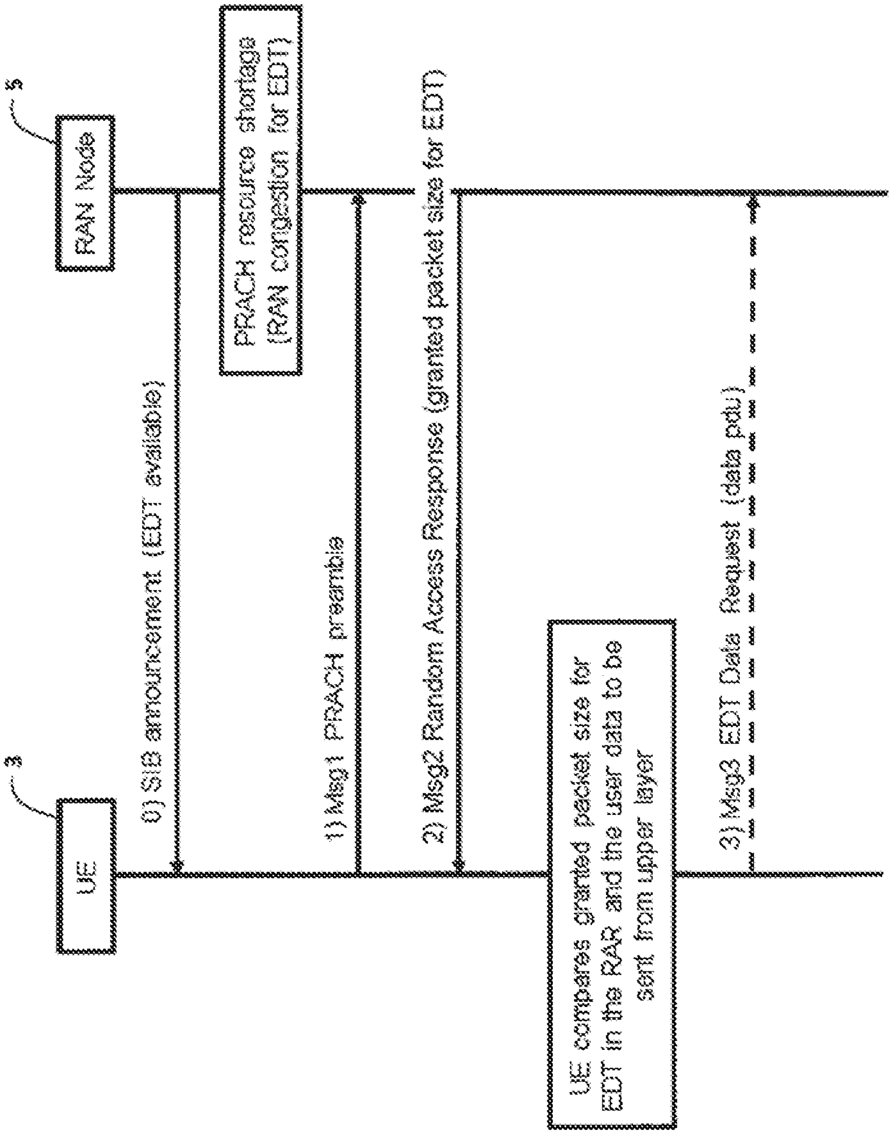
FIG. 6 demonstrates EDT congestion control in a RAN node 5.

FIG. 6 demonstrates EDT congestion control in a RAN node 5 (e.g. eNB/gNB).

0. The RAN node 5 announces in a SIB that the small user data transmission using EDT mechanism is available in the RAN.
1. The UE 3 sends an appropriately formatted Msg1, e.g. a Random Access Preamble.
2. If the PRACH resources are short in the RAN, the RAN sends an appropriately formatted Msg2 with a RAR uplink grant and "granted packet size for EDT" to the UE 3.
3. If the "granted packet size for EDT" is specified in the RAN in Msg2 (Random Access Response message), the UE 3 compares the "granted packet size for EDT" received from the RAN and the User data to be sent from the upper layer of the UE 3 in order to make a decision whether the UE 3 can send the User data within Msg3 (e.g. RRC Connection Request or EDT Data Request or any other name for a message with a purpose of EDT). If the User data in the UE 3 is larger than the "granted packet size for the EDT," the UE 3 falls back to the regular CIoT MO (Mobile Originated) procedure using an appropriately formatted Msg5 (e.g. RRC Connection Setup Complete) or using a data transmission via the User plane.

In summary, FIG. 6 illustrates the use case where the UE 3 sends Msg3 with EDT data since the size of the User data to be sent is smaller than the "granted packet size for EDT" in Msg2 Random Access Response.

Figure 7:
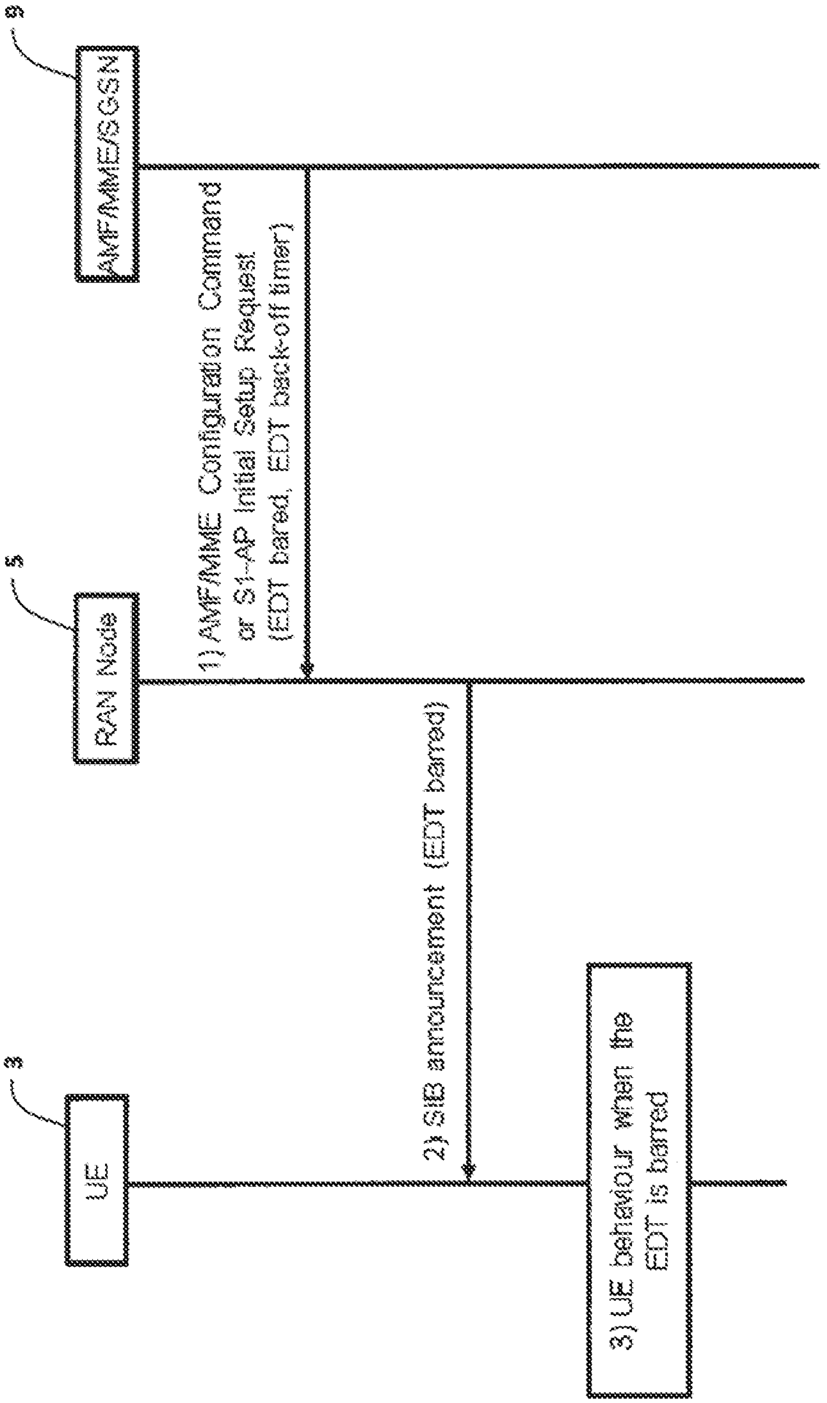
FIG. 7 demonstrates a case that EDT is barred within the whole cell, group of cells, registration area or within the whole Public Land Mobile Network (PLMN).

FIG. 7 demonstrates a case of EDT barring within the whole cell, group of cells, registration area or within the whole PLMN. It is possible that the network operator wishes to bar all the UEs from EDT within a cell, group of cells or registration area.

1) Based on the operator's policy or configuration in the AMF/MME/SGSN 9 or in the O&M module, the AMF/MME/SGSN 9 may indicate an EDT barred indication/parameter to the RAN node 5 in an appropriately formatted AMF/MME Configuration Command or N2-AP or S1-AP Initial Setup Request message or any other suitable (new or existing) message on the N2/S1 interface between the AMF/MME/SGSN 9 and the RAN Node 5 (e.g. gNB or eNB or RNC). The EDT barred indication/parameter (or any other name for indication/parameter on whether the EDT should be barred or not) may take values like "EDT barred," "EDT not barred" or any other value for controlling restriction or authorization of the use of the EDT by the UEs. The AMF/MME/SGSN 9 may indicate an EDT barred indication to one RAN node, to a group of RAN nodes or to all the RAN nodes within the registration area. If the included EDT barred indication is set ON (i.e. EDT is barred), the AMF/MME/SGSN 9 may also include in the same N2/S1 message an EDT back-off timer which defines how long the EDT is barred.

2) When the RAN node 5 receives an EDT barred indication in a N2/S1 message from the AMF/MME/SGSN 9 (e.g. AMF/MME Configuration Command message or N2-AP/S1-AP Initial Setup Request message or any other message from the AMF/MME/SGSN 9), the RAN node 5 saves the received EDT barred indication and sets the EDT barred indication in the SI broadcast to reflect the EDT barred indication from the AMF/MME/SGSN 9.

If EDT back-off timer is included, the RAN node 5 continues to broadcast the EDT barred status until the expiry of the EDT back-off timer or until a new EDT indication is received from the AMF/MME/SGSN 9 that resets the barred status (e.g. allows the use of EDT by the UEs).

If no EDT back-off timer is included, the RAN node 5 continues to broadcast the EDT barred status until new EDT indication is received from the AMF/MME/SGSN 9 that resets the barred status (e.g. allows the use of EDT by the UEs).

3) When the UE 3 in idle mode reads the System Information:

- If the EDT indication/parameter in the System Information (SI) indicates that the EDT is barred, the UE 3 shall not initiate data transmission via the EDT until the EDT indication in the SI indicates a barred status;
- If the EDT indication/parameter in the System Information (SI) indicates that the EDT is not barred or there is no EDT status indication at all, the UE 3 can initiate a data exchange via the EDT, unless the EDT is not restricted by any other means.

Note: All the 3G/4G solution proposals above are equally applicable to 5G where AMF, NEF for SCEF and UDM/UDR for HSS/HLR are used instead of MME/SGSN. The RAN Node may include an RNC in 3G, an eNB in 4G, and a gNB in 5G or NG-RAN.

SUMMARY

Beneficially, the above-described example aspects include, although they are not limited to, one or more of the following functionalities:

1) A new subscription parameter in the UDM/UDR, HSS or HLR called EDT restriction parameter (or EDT authorization parameter or any other name for the parameter for the purpose of authorization or restriction of the EDT use by the UEs).
2) UE indicates its support for EDT or its support for EDT restriction or authorization in an appropriately formatted NAS message to the AMF/MME/SGSN (e.g. Registration, Attach, TAU/RAU Request messages).
3) The AMF/MME/SGSN updates the UE context with the latest status of the EDT restriction/authorization parameter when inquiring of the UDM/UDR, HSS or HLR for UE subscription information.
4) If the UE has included support for EDT restriction/authorization in the Registration/Attach/TAU/RAU Request, the AMF/MME/SGSN provides the UE with the EDT restriction/authorization parameter in the Registration Accept message/Attach Accept message/TAU accept message/RAU accept message or any other NAS message.
5) EDT restriction/authorization control by the Service Operator via the NEF/SCEF.
6) Paging for EDT if the UE is EDT-capable and the UE is not restricted by subscription for use of EDT.
7) EDT resource grant in the Random Access Response message and use of EDT by the UE is the data for transmission not larger than the granted resource for EDT.
8) EDT barring in a cell, group of cells, in registration area or in the entire PLMN via EDT barred indication/parameter broadcast in the System Information.

It can be seen that the above aspects describe a method including one or more of the following steps:

1) A new subscription parameter definition in the UDM/UDR, HSS or HLR called EDT restriction parameter (or EDT authorization parameter or any other name for the parameter for the purpose of authorization or restriction of the EDT use by the UEs).
2) UE indicates its support for EDT or its support for EDT restriction or authorization in a NAS message to the AMF/MME/SGSN (e.g. Registration, Attach, TAU/RAU Request messages).
3) Alternatively, the UE indicates its support for EDT or its support for EDT restriction or authorization first in the RRC message (e.g. RRC Connection Request or RRC Connection Setup Complete or any other AS message) to the RAN Node (gNB, eNB or RNC) and then the RAN Node forwards the EDT restriction/authorization support parameter to the AMF/MME/SGSN within the N2-AP/S1-AP UE Initial message or within any other existing or new message on the N2/S1 interface between the RAN Node and AMF/MME/SGSN.
4) The AMF/MME/SGSN updates the UE context with the latest status of the EDT restriction/authorization parameter when inquiring of the UDM/UDR, HSS or HLR for UE subscriber information.
5) If the UE has included support for EDT restriction/authorization in the Registration/Attach/TAU/RAU Request, the AMF/MME/SGSN provides the UE with the EDT restriction/authorization parameter in the Registration Accept message/Attach Accept message/TAU accept message/RAU accept message or any other NAS message.
6) EDT restriction/authorization control by the Service Operator via the NEF/SCEF.
7) Paging for EDT if the UE is EDT-capable and the UE is not restricted by subscription for use of EDT.
8) EDT resource grant in the Random Access Response message and use of EDT by the UE is the data for transmission not larger than the granted resource for EDT.
9) EDT barring in a cell, group of cells, in registration area or in the entire PLMN via EDT barred indication/parameter broadcast in the System Information.

It can be seen that the above aspects beneficially provide a number of benefits, including (but not limited to) the above:

The proposed EDT restriction/authorization control would enable the network (i.e. network operator) to restrict or authorize the use of EDT per UE or per group of UEs. In order to restrict or authorize the EDT for specific UEs, it is proposed to introduce a new subscription parameter in the UDM/UDR, HSS or HLR called EDT restriction parameter. This way the network operator would be able to prioritize the use of EDT in locations and times when not all EDT-capable UEs are able to make use of the EDT feature.

System Overview

FIG. 8 schematically illustrates a mobile (cellular or wireless) telecommunication system 1 to which the above aspects are applicable.

In this network, users of mobile devices 3A to 3C (or user equipment, 'UE') can communicate with each other and other users via respective base stations 5 and a core network 7 using a 5G radio access technology (RAT). It will be appreciated that a number of base stations 5 (or 'gNBs' in 5G networks, 'eNBs' in LTE) form a (radio) access network. As those skilled in the art will appreciate, whilst three mobile devices 3 and one base station 5 are shown in FIG. 8 for illustration purposes, the system, when implemented, will typically include other base stations and mobile devices. It will also be appreciated that the (radio) access network may also support an E-UTRA radio access technology (e.g. instead of or in addition to 5G).

The core network 7 typically includes logical nodes (or 'functions') for supporting communication in the telecommunication system 1. Typically, for example, the core network 7 of a 'Next Generation'/5G system will include, amongst other functions, control plane functions and user plane functions.

As is well known, a mobile device 3 may enter and leave the areas (i.e. radio cells) served by the base stations 5 or the (R)AN as the mobile device 3 is moving around in the geographical area covered by the telecommunication system 1. In order to keep track of the mobile device 3 and to facilitate movement between the different base stations 5, the core network 7 includes at least one access and mobility management function (AMF) 9. The AMF 9 is in communication with the base station 5 coupled to the core network 7. In some core networks, the functionality of the AMF 9 may be performed by a mobility management entity (MME) or a serving GPRS support node (SGSN).

The core network 7 also includes a UDM/UDR 10 (and/or HSS/HLR, if appropriate), one or more gateways 11, and one or more Application Function (AF) 12, and/or the like. Although not shown in FIG. 8, the core network 7 may also include further nodes, such as a Network Exposure Function (NEF), a Service Capability Exposure Function (SCEF), and/or the like.

The mobile devices 3 and their respective serving base stations 5 are connected via an appropriate air interface (for example the so-called "Uu" interface and/or the like). Neighboring base stations 5 are connected to each other via an appropriate base station to base station interface (such as the so-called 'X2' interface, 'Xn' interface, and/or the like), either directly or via an appropriate (home) base station gateway. Each base station 5 is also connected to the core network nodes 9/10/11/12/13 via an appropriate interface (such as the so-called "S1", "N2"/"N3" interface(s) and/or the like). From the core network 7, connection to an external IP network 20 (such as the Internet) is also provided.

User Equipment (UE)

FIG. 9 is a block diagram illustrating the main components of the UE (mobile device 3). As shown, the UE 3 includes a transceiver circuit 31 which is operable to transmit signals to and receive signals from the connected node(s) via one or more antenna 32. Although not necessarily shown in FIG. 9, the UE 3 will of course have all the usual functionality of a conventional mobile device (such as a user interface 35) and this may be provided by any one or any combination of hardware, software and firmware, as appropriate. Software may be pre-installed in the memory 34 and/or may be downloaded via the telecommunication network or from a removable data storage device (RMD), for example. A controller 33 controls the operation of the UE 3 in accordance with software stored in a memory 34. The software includes, among other things, an operating system 341 and a communications control module 342 having at least a transceiver control module 3421. The communications control module 342 (using its transceiver control module 3421) is responsible for handling (generating/sending/receiving) signaling and uplink/downlink data packets between the UE 3 and other nodes, such as the base station 5 and core network nodes 9/10/11/12/13. Such signaling may include, for example, appropriately formatted signaling messages (e.g. a registration request and associated responses) relating to EDT restriction/authorization control (for the UE 3), and in particular, Registration Request, Attach Request or TAU/RAU Request messages (or any other NAS message), and/or signaling messages relating to a random access procedure.

RAN Node

FIG. 10 is a block diagram illustrating the main components of the RAN node 5 (an RNC or a base station, e.g. eNB/gNB). As shown, the RAN node 5 includes a transceiver circuit 51 which is operable to transmit signals to and receive signals from the UE(s) 3 via one or more antennas 52 and operable to transmit signals to and receive signals from core network nodes 9/10/11/12/13 via a network interface 55 (e.g. S1/N2/N3). The transceiver circuit 51 may also be operable to transmit signals to and receive signals from other base stations via the network interface 55 (via e.g. an X2 or Xn interface). A controller 53 controls the operation of the RAN node 5 in accordance with software stored in a memory 54. Software may be pre-installed in the memory 54 and/or may be downloaded via the telecommunication network or from a removable data storage device (RMD), for example. The software includes, among other things, an operating system 541 and a communications control module 542 having at least a transceiver control module 5421. The communications control module 542 (using its transceiver control module 5421) is responsible for handling (generating/sending/receiving) signaling between the RAN node 5 and other nodes, such as the UE 3, and the core network nodes 9/10/11/12/13 (and other RAN nodes/base stations 5 when appropriate). Such signaling may include, for example, appropriately formatted signaling messages for EDT restriction/authorization control.

Core Network Node

FIG. 11 is a block diagram illustrating the main components of an example core network node 9/10/11/12/13. As shown, the core network node 9/10/11/12/13 includes a transceiver circuit 91/101/111/121/131 which is operable to transmit signals to and receive signals from other network nodes (either directly or indirectly) via a network interface 94/104/114/124/134. A controller 92/102/112/122/132 controls the operation of the core network node 9/10/11/12/13 in accordance with software stored in a memory 93/103/113/123/133. Software may be pre-installed in the memory 93/103/113/123/133 and/or may be downloaded via the telecommunication network or from a removable data storage device (RMD), for example. The software includes, among other things, an operating system 931/1031/1131/1231/1331 and a communications control module 932/1032/1132/1232/1332 having at least a transceiver control module 9321/10321/11321/12321/13321. The communications control module 932/1032/1132/1232/1332 (using its transceiver control module 9321/10321/11321/12321/13321) is responsible for handling (generating/sending/receiving) signaling between the core network node 9/10/11/12/13 and other nodes, such as the UE 3, other core network nodes 9/10/11/12/13, and RAN nodes 5 (either directly or indirectly). The signaling may include, for example, appropriately formatted signaling messages for EDT restriction/authorization control. When the core network node 9/10/11/12/13 provides the functionality of a UDM/UDR, an HSS, or an HLR, it may be configured to store a new subscription parameter herein referred to as an EDT restriction parameter (or EDT authorization parameter or EDT barred parameter or any other name for the parameter for the purpose of authorization or restriction of the EDT used by the UEs).

Modifications and Alternatives

Detailed aspects have been described above. As those skilled in the art will appreciate, a number of modifications and alternatives can be made to the above aspects whilst still benefiting from the disclosures embodied therein. By way of illustration only a number of these alternatives and modifications will now be described.

In the above description, the UE, the RAN node, and the core network node are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may include any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or uncompiled form and may be supplied to the UE, the RAN node, and the core network node as a signal over a computer network, or on a recording medium. Further, the functionality performed by part or all of this software may be performed using one or more dedicated hardware circuits. However, the use of software modules is preferred as it facilitates the updating of the UE, the RAN node, and the core network node in order to update their functionalities.

In the above aspects, a 3GPP radio communications (radio access) technology is used. However, any other radio communications technology (e.g. WLAN, Wi-Fi, WiMAX, Bluetooth, etc.) may also be used in accordance with the above aspects.

Items of user equipment might include, for example, communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description, but it will be appreciated that the technology described can be implemented on any communication devices (mobile and/or generally stationary) that can connect to a communications network for sending/receiving data, regardless of whether such communication devices are controlled by human input or software instructions stored in memory.

Various other modifications will be apparent to those skilled in the art and will not be described in further detail here.

Abbreviations and Terminology

The following abbreviations and terminology are used in the current document:

3GPP 3rd Generation Partnership Project
5G-AN 5G Access Network
5G-RAN 5G Radio Access Network
5GS 5G System
AF Application Function
AMF Access and Mobility Management Function
AS Access Stratum
AUSF Authentication and Security Function
CIoT Cellular Internet of Things
CP Control Plane
DL Down Link
DNN Data Network Name
EDT Early Data Transmission
EPS Evolved Packet System
HARQ Hybrid Automatic Repeat Request
HLR Home Location Register
HSS Home Subscriber Server
eMTC enhanced Machine Type Communication
eNB enhanced NodeB
gNB next Generation NodeB
MAC Medium Access Control
ME Mobile Equipment
MME Mobility management Entity
NB-IoT Narrow Band Internet of Things
NAS Non Access Stratum
NF Network Function
NEF Network Exposure Function
NR New Radio
O&M Operation and Maintenance
PCF Policy Control Function
SCEF Service Capability Exposure Function
SGSN Serving GPRS Support Node
PRACH Physical Random Access Channel
(R)AN Radio Access Network
RAR Random Access Response
RAU Routing Area Update
RNC Radio Network Controller
RRC Radio Resource Control
SIB System Information Block
SIM Subscriber Interface Module
TAU Tracking Area Update
UDM Unified Data Management
UDR Unified Data Repository
UE User Equipment
UL Up Link Supplementary Notes (Supplementary Note 1)

User equipment, UE, comprising:

a receiver configured to receive a parameter indicating whether the UE is restricted or authorized for transmission of user data in a message transmitted on Uplink Synchronization Channel, UL-SCH, from an access network node; and a hardware processor configured to process instructions to determine whether the transmission of the user data in the message is restricted or authorized based on the parameter.

(Supplementary Note 2)

The UE according to supplementary note 1, further comprising a transmitter configured to transmit information for capability of the transmission of the user data in the message, to a core network node via the access network node, wherein the receiver is further configured to receive the parameter after transmitting the information for the capability of the transmission of the user data in the message.

(Supplementary Note 3)

The UE according to supplementary note 1, further comprising a transmitter configured to transmit information for capability to support restricting or authorizing the transmission of the user data in the message, to a core network node via the access network node, wherein the receiver is further configured to receive the parameter, based on the information for the capability to support restricting or authorizing the transmission of the user data in the message.

(Supplementary Note 4)

The UE according to supplementary note 3, wherein the parameter indicating whether the UE is restricted or authorized for the transmission of the user data in the message is based on UE context updated by the core network node.

(Supplementary Note 5)

The UE according to any one of supplementary notes 1 to 4, wherein the parameter indicating whether the UE is restricted or authorized for the transmission of the user data in the message indicates whenever UE context is established.

(Supplementary Note 6)

The UE according to supplementary note 1, wherein:

the parameter indicating whether the UE is restricted or authorized for the transmission of the user data in the message is broadcast from the access network node;

the receiver is further configured to receive information of a granted packet size for the transmission of the user data in the message; and the hardware processor is further configured to determine whether the UE transmits the user data based on the information of the granted packet size for the transmission of the user data in the message.

(Supplementary Note 7)

The UE according to supplementary note 1, wherein:

the parameter indicating whether the UE is restricted or authorized for the transmission of the user data in the message is broadcast from the access network node; and the parameter indicating whether the UE is restricted or authorized for the transmission of the user data in the message indicates that the transmission is barred.

(Supplementary Note 8)

The UE according to any one of supplementary notes 1 to 7, wherein:

the receiver is further configured to receive the parameter indicating whether the UE is restricted or authorized for the transmission of the user data in the message and a value of a back-off timer for the transmission of the user data; and the hardware processor is further configured to process instructions to determine whether the UE transmits the user data in the message based on the value of the back-off timer.

(Supplementary Note 9)

The UE according to supplementary note 8, wherein the hardware processor is further configured to not attempt for the transmission of the user data in the message until the UE moves to another Radio Access Technology, RAT, or restriction of the transmission of the user data in the message is lifted by the core network node.

(Supplementary Note 10)

The UE according to any one of supplementary notes 1 to 7, wherein:

the receiver is further configured to receive a value "Early Data Transmission, EDT, Temporally not available" from the core network node; and the hardware processor is further configured to not attempt for the transmission of the user data in the message until a back-off timer for Cellular Internet of Things, CIoT, Control Plane in the UE is expired.

(Supplementary Note 11)

A core network node, comprising:

a memory for storing instructions; and at least one processor configured to process instructions to determine whether user equipment, UE, is restricted or authorized for transmission of user data in a message transmitted on Uplink Synchronization Channel, UL-SCH.

(Supplementary Note 12)

The core network node according to supplementary note 11, further comprising a transmitter configured to transmit a parameter indicating whether the UE is restricted or authorized for the transmission of the user data in the message, to the UE via an access network node.

(Supplementary Note 13)

The core network node according to supplementary note 12, further comprising a receiver configured to receive information for capability of the transmission of the user data in the message, from the UE via the access network node, wherein the transmitter is further configured to transmit the parameter, based on the information for the capability of the transmission of the user data in the message.

(Supplementary Note 14)

The core network node according to supplementary note 12, further comprising a receiver configured to receive information for capability to support restricting or authorizing the transmission of the user data in the message, from the UE via the access network node, wherein the transmitter is further configured to transmit the parameter, based on the information for the capability to support restricting or authorizing the transmission of the user data in the message.

(Supplementary Note 15)

The core network node according to supplementary note 14, wherein:

the transmitter is further configured to transmit a request for subscription information corresponding to the UE, to a server for subscription data; and the receiver is further configured to receive the parameter indicating whether the UE is restricted or authorized for the transmission of the user data in the message.

(Supplementary Note 16)

The core network node according to any one of supplementary notes 12 to 15, wherein the receiver is further configured to receive an Insert Subscriber Data Request, from a server for subscription data, the core network node further comprising a hardware processor configured to process instructions to update the parameter indicating whether the UE is restricted or authorized for the transmission of the user data in the message, wherein the transmitter is further configured to transmit the updated parameter to the UE.

(Supplementary Note 17)

The core network node according to supplementary note 11, further comprising:

a receiver configured to receive a Downlink Data Indication, DDI, with a request for the transmission of the user data in the message, from a network node for user plane data; and a transmitter configured to transmit a Paging Request for the transmission of the user data in the message, to the UE, based on a result of determining whether the UE is restricted or authorized for the transmission of the user data in the message.

(Supplementary Note 18)

The core network node according to any one of supplementary notes 12 to 16, wherein:

the parameter indicating whether the UE is restricted or authorized for the transmission of the user data in the message indicates that the transmission is barred;

the transmitter is further configured to transmit a configuration command including the parameter indicating that the transmission is barred, to the access network node; and the access network node is further configured to broadcast the parameter indicating that the transmission is barred, to at least the UE.

(Supplementary Note 19)

An access network node, comprising a transmitter configured to transmit a parameter indicating whether user equipment, UE, is restricted or authorized for transmission of user data in a message transmitted on Uplink Synchronization Channel, UL-SCH, to the UE and information of a granted packet size for the transmission of the user data in the message.

(Supplementary Note 20)

A method for user equipment, UE, comprising:

receiving a parameter indicating whether the UE is restricted or authorized for transmission of user data in a message transmitted on Uplink Synchronization Channel, UL-SCH, from an access network node; and processing instructions to determine whether the transmission of the user data in the message is restricted or authorized based on the parameter.

(Supplementary Note 21)

The method according to supplementary note 20, further comprising:

transmitting information for capability of the transmission of the user data in the message, to a core network node via the access network node; and receiving the parameter after transmitting the information for the capability of the transmission of the user data in the message.

(Supplementary Note 22)

The method according to supplementary note 20, further comprising:

transmitting information for capability to support restricting or authorizing the transmission of the user data in the message, to a core network node via the access network node; and receiving the parameter, based on the information for the capability to support restricting or authorizing the transmission of the user data in the message.

(Supplementary Note 23)

The method according to supplementary note 22, wherein the parameter indicating whether the UE is restricted or authorized for the transmission of the user data in the message is based on UE context updated by the core network node.

(Supplementary Note 24)

The method according to any one of supplementary notes 20 to 23, wherein the parameter indicating whether the UE is restricted or authorized for the transmission of the user data in the message indicates whenever UE context is established.

(Supplementary Note 25)

The method according to supplementary note 20, wherein the parameter indicating whether the UE is restricted or authorized for the transmission of the user data in the message is broadcast from the access network node, the method further comprising:

receiving information of a granted packet size for the transmission of the user data in the message; and determining whether the UE transmits the user data based on the information of the granted packet size for the transmission of the user data in the message.

(Supplementary Note 26)

The method according to supplementary note 20, wherein:

the parameter indicating whether the UE is restricted or authorized for the transmission of the user data in the message is broadcast from the access network node; and the parameter indicating whether the UE is restricted or authorized for the transmission of the user data in the message indicates that the transmission is barred.

(Supplementary Note 27)

The method according to any one of supplementary notes 20 to 26, further comprising:

receiving the parameter indicating whether the UE is restricted or authorized for the transmission of the user data in the message and a value of a back-off timer for the transmission of the user data; and processing instructions to determine whether the UE transmits the user data in the message based on the value of the back-off timer.

(Supplementary Note 28)

The method according to supplementary note 27, further comprising not attempting for the transmission of the user data in the message until the UE moves to another Radio Access Technology, RAT, or restriction of the transmission of the user data in the message is lifted by the core network node.

(Supplementary Note 29)

The method according to any one of supplementary notes 20 to 26, further comprising:

receiving a value "Early Data Transmission, EDT, Temporally not available" from the core network node; and not attempting for the transmission of the user data in the message until a back-off timer for Cellular Internet of Things, CIoT, Control Plane in the UE is expired.

(Supplementary Note 30)

A method for a core network node, comprising:

storing instructions; and processing instructions to determine whether user equipment, UE, is restricted or authorized for transmission of user data in a message transmitted on Uplink Synchronization Channel, UL-SCH.

(Supplementary Note 31)

The method according to supplementary note 30, further comprising transmitting a parameter indicating whether the UE is restricted or authorized for the transmission of the user data in the message, to the UE via an access network node.

(Supplementary Note 32)

The method according to supplementary note 31, further comprising:

receiving information for capability of the transmission of the user data in the message, from the UE via the access network node; and transmitting the parameter, based on the information for the capability of the transmission of the user data in the message.

(Supplementary Note 33)

The method according to supplementary note 31, further comprising:

receiving information for capability to support restricting or authorizing the transmission of the user data in the message, from the UE via the access network node; and transmitting the parameter, based on the information for the capability to support restricting or authorizing the transmission of the user data in the message.

(Supplementary Note 34)

The method according to supplementary note 33, further comprising:

transmitting a request for subscription information corresponding to the UE, to a server for subscription data; and receiving the parameter indicating whether the UE is restricted or authorized for the transmission of the user data in the message.

(Supplementary Note 35)

The method according to any one of supplementary notes 31 to 34, further comprising:

receiving an Insert Subscriber Data Request, from a server for subscription data;

processing instructions to update the parameter indicating whether the UE is restricted or authorized for the transmission of the user data in the message; and transmitting the updated parameter to the UE.

(Supplementary Note 36)

The method according to supplementary note 30, further comprising:

receiving a Downlink Data Indication, DDI, with a request for the transmission of the user data in the message, from a network node for user plane data; and transmitting a Paging Request for the transmission of the user data in the message, to the UE, based on a result of determining whether the UE is restricted or authorized for the transmission of the user data in the message.

(Supplementary Note 37)

The method according to any one of supplementary notes 31 to 35, wherein the parameter indicating whether the UE is restricted or authorized for the transmission of the user data in the message indicates that the transmission is barred, the method further comprising:

transmitting a configuration command including the parameter indicating that the transmission is barred, to the access network node; and broadcasting the parameter indicating that the transmission is barred, to at least the UE.

(Supplementary Note 38)

A method for an access network node, comprising transmitting a parameter indicating whether user equipment, UE, is restricted or authorized for transmission of user data in a message transmitted on Uplink Synchronization Channel, UL-SCH, to the UE and information of a granted packet size for the transmission of the user data in the message.

(Supplementary Note 39)

A system comprising user equipment, UE, and an access network node, wherein:

the UE includes the configuration disclosed in supplementary note 1; and the access network node includes the configuration disclosed in supplementary note 19.

EXPLANATION OF REFERENCE NUMERALS

1 telecommunication system
3 UE
31 transceiver circuit
32 antenna
33 controller
34 memory
341 operating system
342 communications control module
3421 transceiver control module
35 user interface
5 eNB, RAN Node
51 transceiver circuit
52 antenna
53 controller
54 memory
541 operating system
542 communications control module
5421 transceiver control module
55 network interface
7 core network
9 AMF/MME/SGSN
10 UDM/UDR/HSS/HLR
11 SGW/PGW (GW)
12 SCS/AS
13 NEF/SCEF
91/101/111/121/131 transceiver circuit
92/102/112/122/132 controller
93/103/113/123/133 memory
931/1031/1131/1231/1331 operating system
932/1032/1132/1232/1332 communications control module
9321/10321/11321/12321/13321 transceiver control module
94/104/114/124/134 network interface
20 external IP network

The invention claimed is:

1. A method performed by a user equipment (UE), the method comprising:

receiving, from a radio access network node, System Information comprising first information, second information and third information, the first information indicating whether the UE is allowed to initiate an early data transmission (EDT), the second information indicating a first size, and the third information indicating that the UE is allowed to transmit a small uplink data; and transmitting, to the radio access network node, the uplink data in a message during a random access procedure, in a case where the first information indicates that the UE is allowed to initiate the EDT, a size of an uplink data is smaller than the first size indicated by the second information, and the third information indicates that the UE is allowed to transmit the small uplink data.

2. The method according to claim 1, further comprising transmitting the uplink data using a message 5 in a case where the size of the uplink data exceeds the first size indicated by the second information.

3. The method according to claim 1, further comprising transmitting the uplink data using a data transmission via a User plane in a case where the size of the uplink data exceeds the first size indicated by the second information.

4. The method according to claim 1, the method comprises receiving, from the RAN, a first paging message comprising first information related to a Mobile Terminated communication handling Procedure and second information related to identity for the UE, the first paging message being sent by the RAN based on a second paging message being received from an Access and Mobility Management Function (AMF).

5. The method according to claim 1, the method comprises:

receiving, from the RAN, fourth information indicating a first data volume threshold; and receiving, from the RAN, fifth information indicating a first timer, wherein in a case where a configured amount of uplink (UL) data, awaiting transmission for a small data transmission procedure, is less than or equal to the first data volume threshold, and a valid resource for the small data transmission procedure is available, the method comprises initiating the small data transmission procedure after a time indicated by the first timer.

6. A user equipment (UE) comprising:

one or more memories storing instructions; and one or more processors configured to process the instructions to control the UE to:

receive, from a radio access network node, System Information comprising first information, second information, and third information, the first information indicating whether the UE is allowed to initiate an early data transmission (EDT), the second information indicating a first size, and the third information indicating that the UE is allowed to transmit a small uplink data; and transmit, to the radio access network node, the uplink data in a message during a random access procedure, in a case where the first information indicates that the UE is allowed to initiate the EDT, a size of an uplink data is smaller than the first size indicated by the second information, and the third information indicates that the UE is allowed to transmit the small uplink data.

* * * * *